US011876428B2

United States Patent
Gomi

(10) Patent No.: US 11,876,428 B2
(45) Date of Patent: Jan. 16, 2024

(54) VIBRATION APPARATUS

(71) Applicant: NIPPON TELEGRAPH AND TELEPHONE CORPORATION, Tokyo (JP)

(72) Inventor: Hiroaki Gomi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 222 days.

(21) Appl. No.: 17/435,782

(22) PCT Filed: Feb. 25, 2020

(86) PCT No.: PCT/JP2020/007289
§ 371 (c)(1),
(2) Date: Sep. 2, 2021

(87) PCT Pub. No.: WO2020/184158
PCT Pub. Date: Sep. 17, 2020

(65) Prior Publication Data
US 2022/0149709 A1  May 12, 2022

(30) Foreign Application Priority Data
Mar. 8, 2019 (JP) .................................. 2019-042136

(51) Int. Cl.
H02K 33/04 (2006.01)
(52) U.S. Cl.
CPC .................................... H02K 33/04 (2013.01)
(58) Field of Classification Search
CPC ........ H02K 33/00; H02K 33/02; H02K 33/06; H02K 33/04; H02K 33/16; H02K 35/02;
(Continued)

(56) References Cited

U.S. PATENT DOCUMENTS 10,938,276 B2 * 3/2021 Krupenkin ................ F03G 7/08
11,150,731 B2 * 10/2021 Amin-Shahidi ........ G06F 3/016
(Continued)

FOREIGN PATENT DOCUMENTS

| CN | 107797654 A | 3/2018 |
| CN | 109070138 A | 12/2018 |
| EP | 3446795 A1 | 2/2019 |

OTHER PUBLICATIONS

Amemiya et al. (2014) "Buru-Navi3 Gives You a Feeling of Being Pulled", NTT Technical Review, vol. 12, No. 11, Nov. 2014.

*Primary Examiner* — Maged M Almawri

(57) ABSTRACT

An operation on a vibration device presenting a force sense based on vibration to a human body is simplified. The vibration device includes: a base mechanism; an actuator configured to perform a physical motion based on a supplied control signal; a slide mechanism configured to perform a periodic reciprocating slide motion in a predetermined direction and an opposite direction to the predetermined direction with respect to the base mechanism based on the physical motion of the actuator and to give a force based on the reciprocating slide motion to a part of a human body with which the slide mechanism comes into direct or indirect contact; and a detection unit located in the predetermined direction with respect to the slide mechanism and configured to detect displacement of a specific portion included in the slide mechanism. The specific portion is movable in the predetermined direction by a width greater than an amplitude at the time of the reciprocating slide motion when a force is given to the slide mechanism from the part of the human body with which the slide mechanism comes into direct or indirect contact. Driving control is performed on the actuator when the detection unit detects the specific portion moved in the predetermined direction by the width (Continued)

greater than the amplitude at the time of the reciprocating slide motion.

6 Claims, 9 Drawing Sheets

(58) Field of Classification Search
CPC .. H02K 2201/00; H02K 2201/18; B06B 1/04; B06B 1/045; G06F 3/16; G06F 3/02
USPC .......................................................... 310/28
See application file for complete search history.

(56) References Cited

U.S. PATENT DOCUMENTS

| | | | | |
|---|---|---|---|---|
| 2001/0002977 | A1* | 6/2001 | Morita | F04B 49/12 |
| | | | | 417/416 |
| 2013/0201127 | A1* | 8/2013 | Abe | G06F 3/016 |
| | | | | 345/173 |
| 2014/0132187 | A1* | 5/2014 | Mori | G02B 7/1821 |
| | | | | 318/128 |
| 2015/0155814 | A1* | 6/2015 | Nishidate | A61H 23/0263 |
| | | | | 318/114 |
| 2018/0067556 | A1* | 3/2018 | Fujii | G06F 3/016 |
| 2018/0121078 | A1* | 5/2018 | Kim | G06F 3/04883 |
| 2019/0087063 | A1* | 3/2019 | Gomi | H02K 35/02 |
| 2019/0391654 | A1* | 12/2019 | Taninaka | G06F 3/016 |
| 2020/0136488 | A1* | 4/2020 | Takahashi | H02K 33/06 |
| 2021/0200315 | A1* | 7/2021 | Borgerding | G06F 3/0414 |
| 2021/0357045 | A1* | 11/2021 | Kadowaki | G06F 3/04142 |

* cited by examiner

VIBRATION APPARATUS

CROSS-REFERENCE TO RELATED APPLICATIONS

This application is a U.S. 371 Application of International Patent Application No. PCT/JP2020/007289, filed on 25 Feb. 2020, which application claims priority to and the benefit of JP Application No. 2019-042136, filed on 8 Mar. 2019, the disclosures of which are hereby incorporated herein by reference in their entireties.

TECHNICAL FIELD

The present invention relates to a vibration device that gives a force based on vibration.

BACKGROUND ART

Vibration devices that control electric actuators on the basis of control signals and present force senses based on vibration to human bodies have been proposed (for example, see NPL 1 and the like). In such vibration devices, even in situations in which users do not want to perceive vibration, vibration may continue when control signals are input. Accordingly, providing separate switches or the like so that users can freely operate driving and stopping of the actuators can be considered.

CITATION LIST

Non Patent Literature

[NPL 1] Tomohiro Amemiya, Shinya Takamuku, Sho Ito, and Hiroaki Gomi, "Buru-Navi3 Gives You a Feeling of Being Pulled", NTT Technical Review, Vol. 12, No. 11, November 2014.

SUMMARY OF THE INVENTION

Technical Problem

In a vibration device, perceived vibration differs depending on how it is gripped. Therefore, a correct position (a predetermined position) is required to be gripped in many cases. However, when a switch mechanism is provided separately from a vibration mechanism presenting vibration to a human body, a part of the human body such as a finger has to be detached from the predetermined position in order to operate the switch. The operation of the switch becomes complicated and returning to the predetermined position is necessary, which is troublesome. This problem is not limited to switches for operating driving and stopping of actuators and is common when operation units are provided separately for users to perform input operations.

The present invention has been devised in view of such circumstances and an objective of the present invention is to simplify an input operation performed by a user on a vibration device that presents a force sense based on vibration to a human body.

Means for Solving the Problem

To solve the foregoing problems, according to an aspect of the present invention, a vibration device includes: a base mechanism; an actuator configured to perform a physical motion based on a supplied control signal; a slide mechanism configured to perform a periodic reciprocating slide motion in a predetermined direction and an opposite direction to the predetermined direction with respect to the base mechanism based on the physical motion of the actuator and to give a force based on the reciprocating slide motion to a part of a human body with which the slide mechanism comes into direct or indirect contact; and a detection unit located in the predetermined direction with respect to the slide mechanism and configured to detect displacement of a specific portion included in the slide mechanism. The specific portion is movable in the predetermined direction by a width greater than an amplitude at the time of the reciprocating slide motion when a force is given to the slide mechanism from the part of the human body with which the slide mechanism comes into direct or indirect contact. Driving control is performed on the actuator when the detection unit detects the specific portion moved in the predetermined direction by the width greater than the amplitude at the time of the reciprocating slide motion.

Effects of the Invention

A slide mechanism giving a force based on a reciprocating slide motion to a human body is used as a mechanism operating driving control on an actuator. Thus, it is possible to simplify an operation of a vibration device that presents a force sense based on vibration to the human body.

BRIEF DESCRIPTION OF DRAWINGS

FIGS. 4A and 4B are schematic cross-sectional views along the line of 3A-3A of the actuator according to the first embodiment.

DESCRIPTION OF EMBODIMENTS

Figure 1:
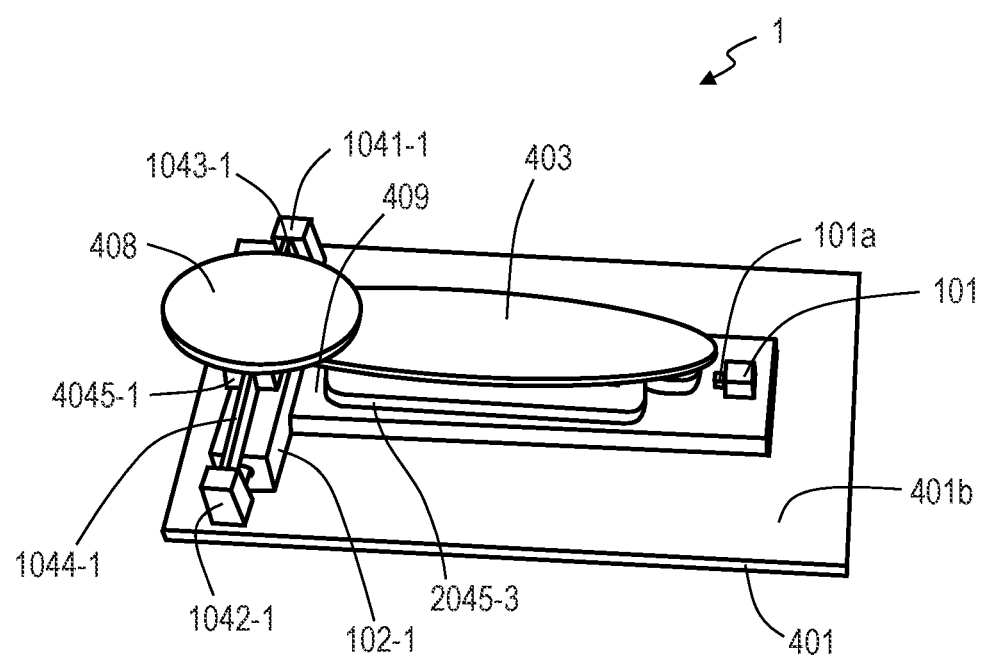
FIG. 1 is a perspective view exemplifying a pseudo-force sense presentation device according to a first embodiment.
Figure 2:
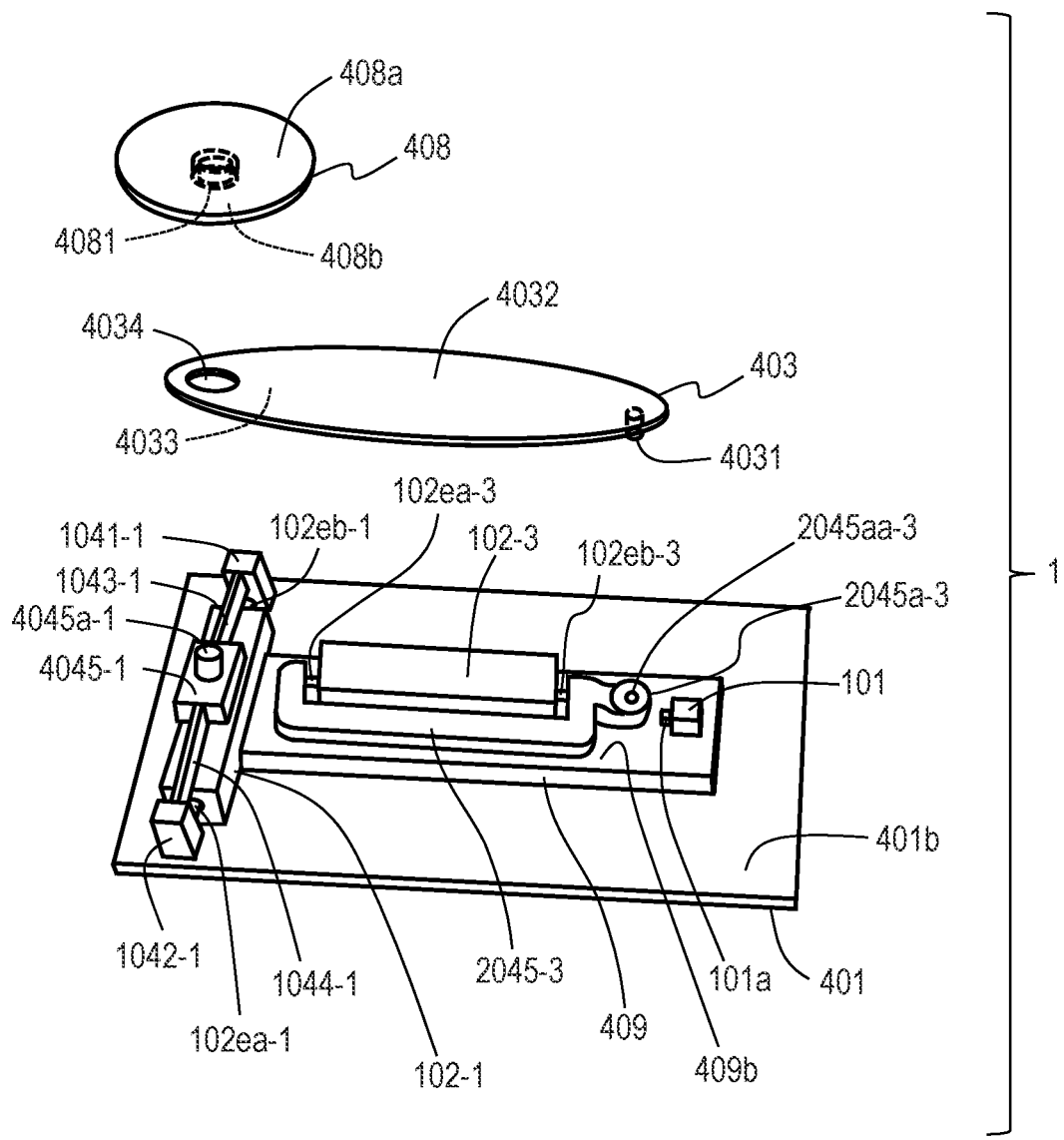
FIG. 2 is a disassembled perspective view exemplifying the pseudo-force sense presentation device according to the first embodiment.
Figure 3A:
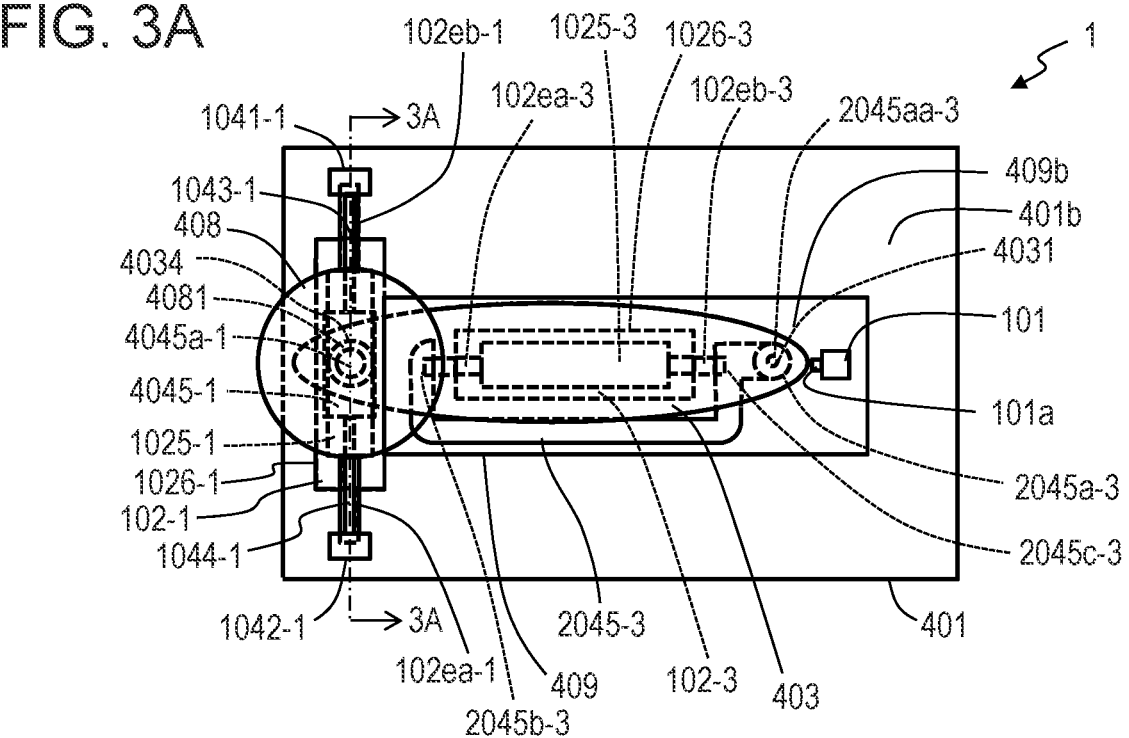
FIG. 3A is a transparent plan view exemplifying a configuration of a vibration device according to the first embodiment.
Figure 3B:
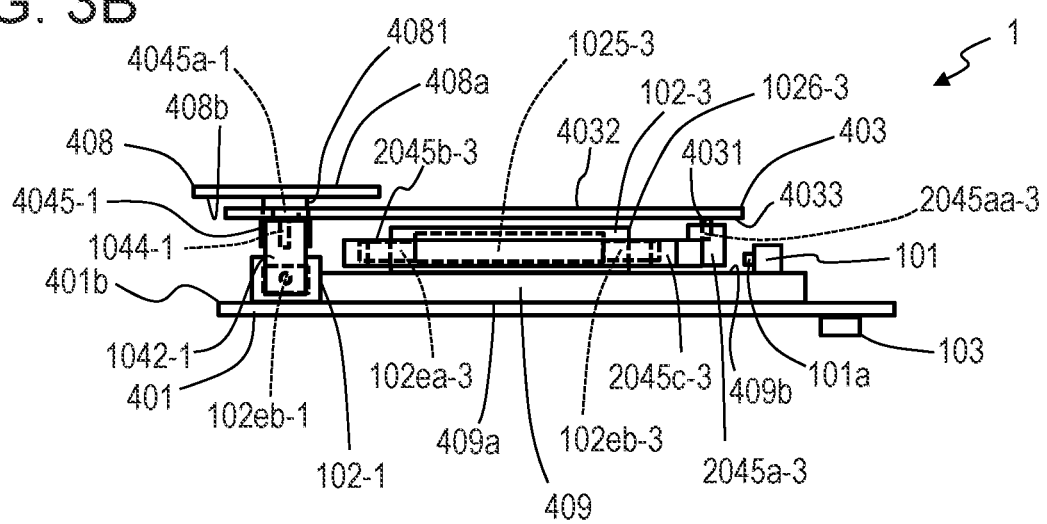
FIG. 3B is a transparent front view exemplifying a configuration of the vibration device according to the first embodiment.
Figure 3C:
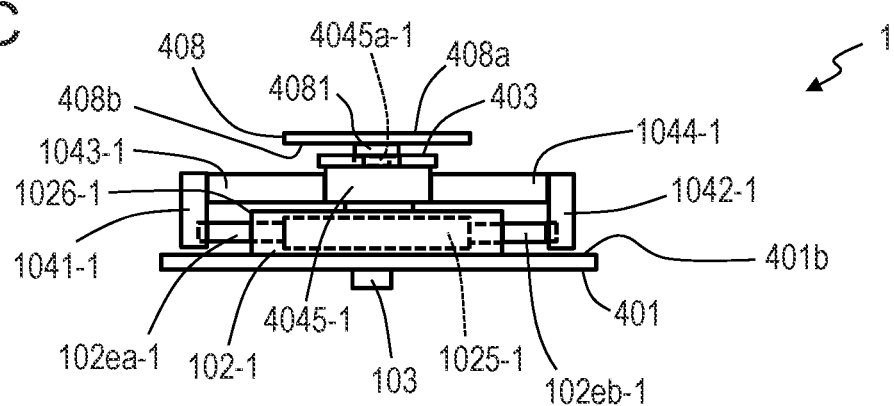
FIG. 3C is a transparent side view from the left side of FIG. 3A exemplifying a configuration of the vibration device according to the first embodiment.
Figure 4A:
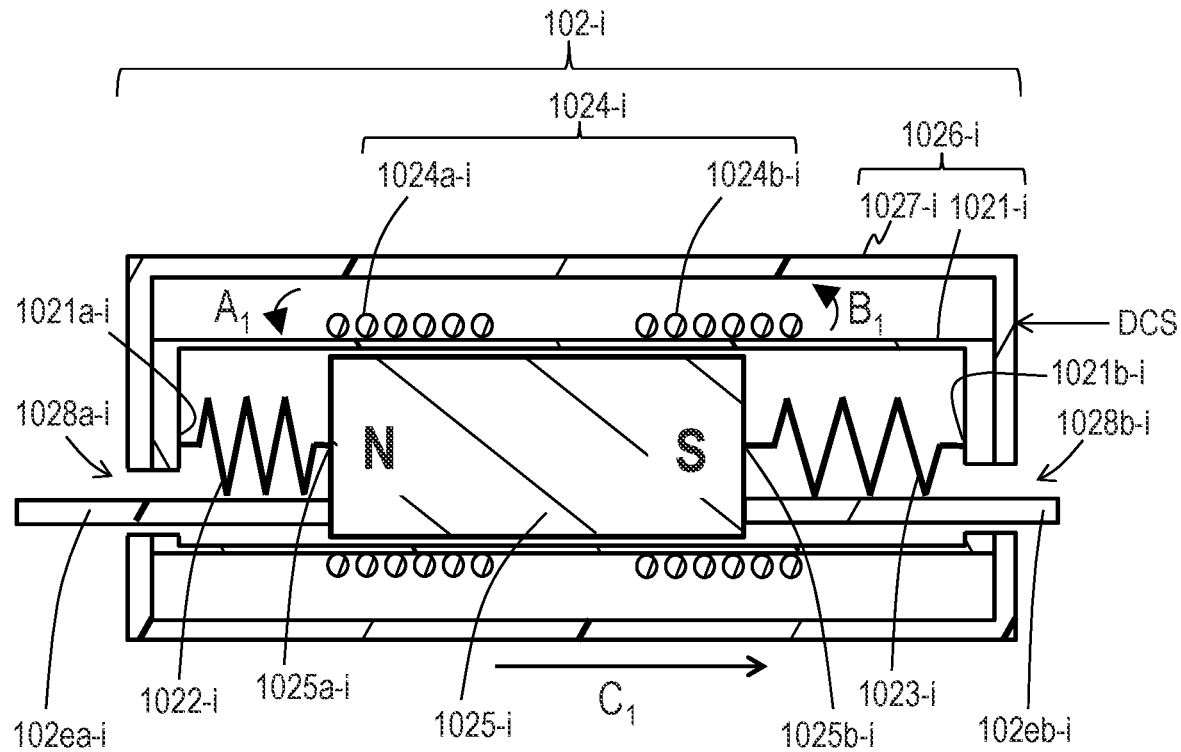
FIGS. 4A and 4B are conceptual diagrams exemplifying a configuration of an actuator according to the first embodiment.
Figure 4B:
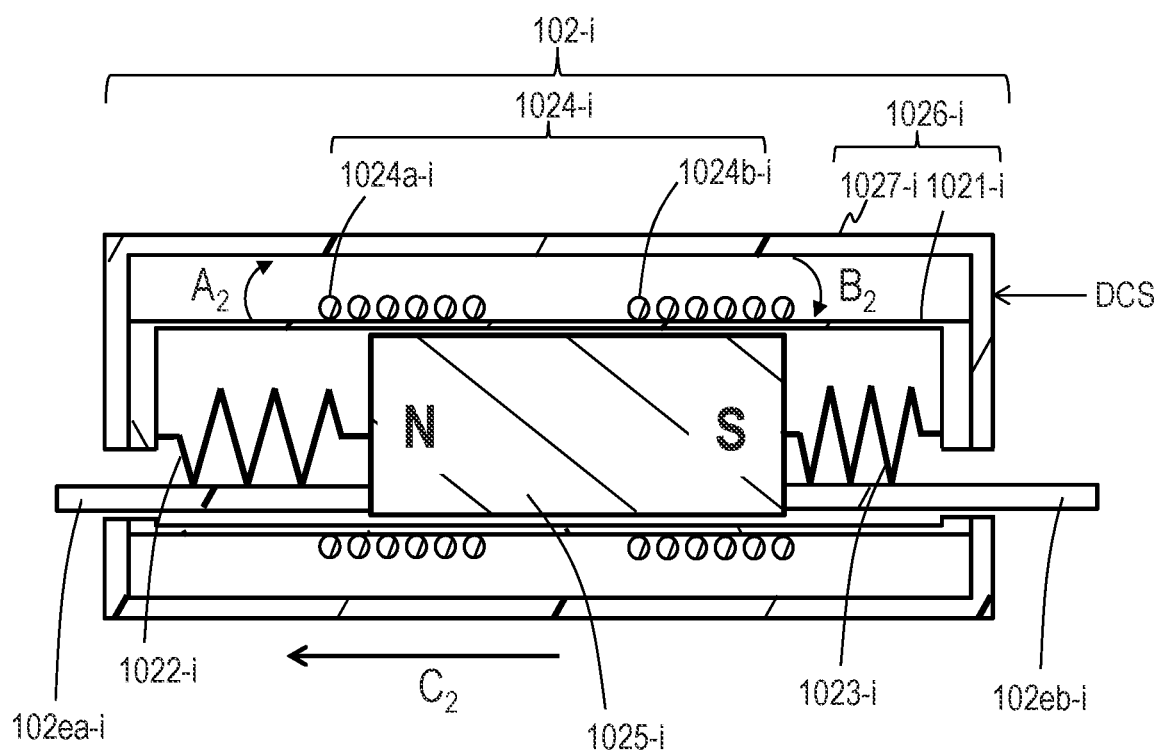

Hereinafter, embodiments of the present invention will be described with reference to the drawings.

First Embodiment

First, a first embodiment will be described.

A configuration of a vibration device 1 according to the embodiment will be described with reference to FIGS. 1 to 5. As exemplified in FIGS. 1 to 5, the vibration device 1 according to the embodiment includes a base unit 401, an actuator 102-$i$ (where i=1, 3), plate spring units 1043-1 and 1044-1, linking units 1041-1 and 1042-1, a fixed unit 4045-1, a linking unit 2045-3, a pedestal 409, a connection unit 403, a contact unit 408, a switch 101 (a detection unit), and a control unit 103. The actuator 102-$i$ (where i=1, 3) includes a support unit 1026-$i$, a movable unit 1025-$i$, a linking unit 102ea-$i$, and a linking unit 102eb-$i$.

A mechanism including the base unit 401, the pedestal 409, and the support units 1026-1 and 1026-3 (for example, a mechanism formed by these units) corresponds to a "base mechanism". A mechanism including the movable unit 1025-$i$, the linking units 102ea-$i$ and 102eb-$i$ (where i=1, 3), the plate spring units 1043-1 and 1044-1, the fixed unit 4045-1, the linking unit 2045-3, the connection unit 403, and the contact unit 408 (for example, a mechanism formed by these units) corresponds to a "slide mechanism". The "slide mechanism" performs a periodic reciprocating slide motion in a predetermined direction (XB4 direction in FIG. 5) and an opposite direction (XA4 direction) to the predetermined direction with respect to the base mechanism based on the physical motion of the actuator 102-$i$ to give a force based on the reciprocating slide motion to a part of a human body with which the slide mechanism comes into direct or indirect contact. The slide mechanism according to the embodiment performs a periodic asymmetric vibration so that the human body can perceive a pseudo-force sense based on the reciprocating slide motion. However, the present invention is not limited thereto.

<Base Unit 401>

The base unit 401 is a plate member formed of a synthetic resin such as an ABS resin. An example of the base unit 401 is an electronic circuit board (for example, a circuit board of a smartphone terminal device) on which electronic components are mounted. The bottom surface of the actuator 102-1 (the bottom surface of the support unit 1026-1) and one plate surface 409a of the plated pedestal 409 are fixed to one plate surface 401b of the base unit 401. The bottom surface of the actuator 102-3 (the bottom surface of the support unit 1026-3) is fixed to the other plate surface 409b of the pedestal 409. An angle formed between a longitudinal direction of the fixed actuator 102-1 and a longitudinal direction of the fixed actuator 102-3 is substantially 90°. The longitudinal direction of the actuator 102-1 is disposed along one side of the base unit 401, the longitudinal direction of the fixed actuator 102-3 is substantially orthogonal to the one side, and the center of the actuator 102-1 is disposed at a position at which the actuator 102-3 extends in the longitudinal direction.

<Actuator 102-$i$>

The actuator 102-$i$ (where i=1, 3) includes the support unit 1026-$i$, the movable unit 1025-$i$, the linking unit 102eb-$i$, and the linking unit 102ea-$i$. The movable unit 1025-$i$ performs asymmetric vibration with respect to the support unit 1026-$i$. The linking unit 102eb-$i$ is connected to or integrated with one end of the movable unit 1025-$i$ in the longitudinal direction to have a rodlike shape extending in the longitudinal direction. The linking unit 102ea-$i$ is connected to or integrated with the other end of the movable unit 1025-$i$ and linking unit 102eb-$i$ in the longitudinal direction to extend in the longitudinal direction.

The actuator 102-$i$ performs a physical motion based on a supplied control signal. A configuration of the actuator 102-$i$ is disclosed in, for example, Reference Literature 1 (WO2017/183537). As exemplified in FIGS. 4A and 4B, the actuator 102-$i$ is an electric actuator that performs physical motion based on a supplied control signal.

Figure 5:
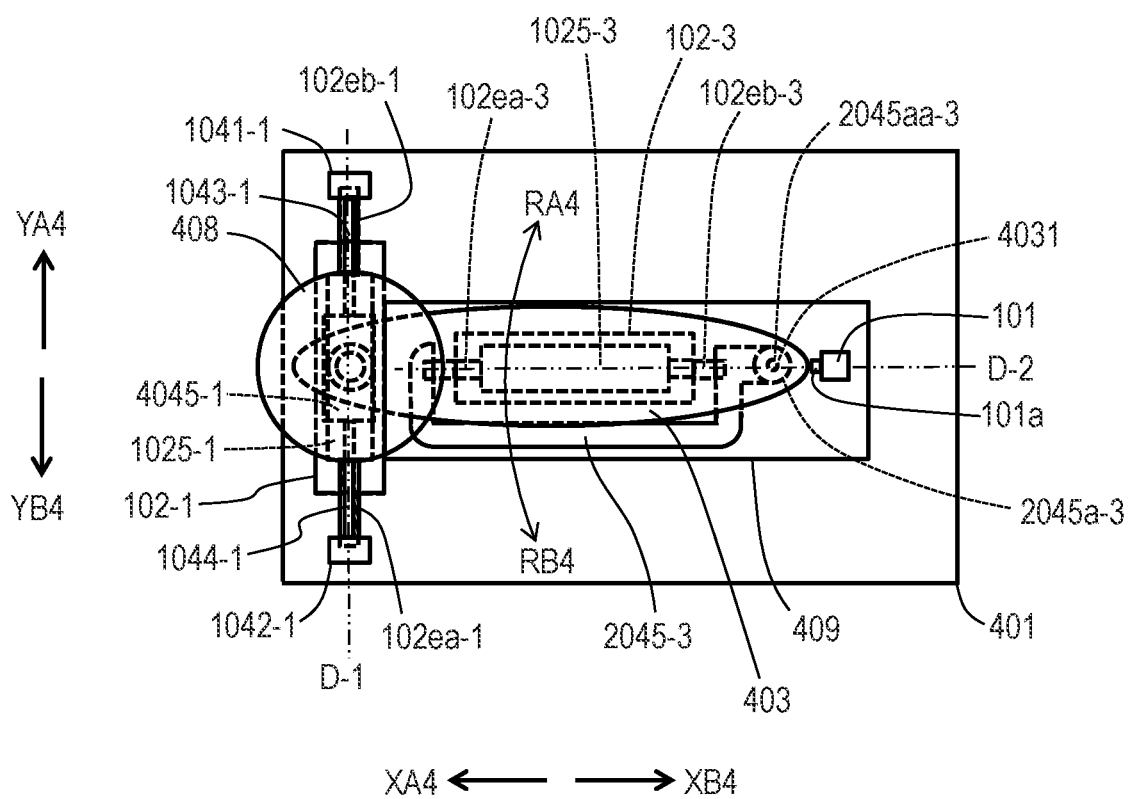
FIG. 5 is a diagram exemplifying an operation of the vibration device according to the first embodiment.

As exemplified in FIG. 5, the movable unit 1025-$i$ can vibrate in a state which the movable unit 1025-$i$ is supported by the support unit 1026-$i$ asymmetrically with respect to the support unit 1026-$i$ along a D-$i$ axis passing through the linking units 102ea-$i$ and 102eb-$i$. Vibration directions (a core direction of the D-$i$ axis) of the asymmetric vibration are all substantially parallel to the plate surface 401b of the base unit 401, and an angle formed between the D-1 axis and a D-2 axis is substantially 90°.

<Linking Units 1041-1 and 1042-1>

The linking units 1041-1 and 1042-1 are columnar rigid bodies or members considered to be rigid bodies. The linking units 1041-1 and 1042-1 are formed of, for example, a synthetic resin. The other end of the linking unit 102ea-1 disposed outside of the support unit 1026-1 supports a lateral surface of one end of the linking unit 1042-1. The other end of the linking unit 102eb-1 disposed outside of the support unit 1026-1 supports a lateral surface of one end of the linking unit 1041-1. The linking unit 1041-1 is disposed outside of one end of the actuator 102-1 in the longitudinal direction and the linking unit 1042-1 is disposed outside of the other end of the actuator 102-1 in the longitudinal direction.

<Plate Spring Units 1043-1 and 1044-1 and Fixed Unit 4045-1>

The plate spring units 1043-1 and 1044-1 are plated springs formed of a synthetic resin. One ends of the plate spring units 1043-1 and 1044-1 are supported by the linking units 1041-1 and 1042-1, respectively. The other ends of the plate spring units 1043-1 and 1044-1 are supported by the fixed unit 4045-1. The fixed unit 4045-1 is a plated member that includes a columnar protrusion 4045a-1. The fixed unit 4045-1 can be formed of, for example, a synthetic resin. The protrusion 4045a-1 is provided outside of the fixed unit 4045-1 (opposite to the actuator 102-1). The plate spring units 1043-1 and 1044-1 are arranged in a direction extending along the D-1 axis, and the fixed unit 4045-1 is disposed between the plate spring units 1043-1 and 1044-1.

<Linking Unit 2045-3>

The linking unit 2045-3 is a member formed of a substantially G-shaped synthetic resin or the like. The other end of the linking unit 102ea-3 disposed outside of the support unit 1026-3 of the actuator 102-3 supports one end 2045b-3 of the linking unit 2045-3. The other end of the linking unit 102eb-3 disposed outside the support unit 1026-3 supports the other end 2045c-3 of the linking unit 2045-3. The one end 2045b-3 and the other end 2045c-3 of the linking unit 2045-3 and the cores of the linking units 102ea-3 and 102eb-3 are disposed along the D-2 axis. A support unit 2045a-3 including an insertion hole 2045aa-3 is provided at the other end 2045c-3 of the linking unit 2045-3. An angle formed between the core of a central axis of an insertion hole 2045aa-3 and the D-1 axis and an angle formed between the core of the central axis of the insertion hole 2045aa-3 and the D-2 axis are both substantially 90°. When the actuator 102-3 is driven, the linking unit 2045-3 performs asymmetric vibration along the D-2 axis with respect to a base unit 201.

<Connection Unit 403 and Contact Unit 408>

The connection unit 403 is a plated member formed of a synthetic resin or the like and the contact unit 408 is a discoid member formed of a synthetic resin or the like. A columnar rotation shaft 4031 is provided on one plate surface 4033 at one end of the connection unit 403. A through-hole 4034 that penetrates between the plate surface 4033 and a plate surface 4032 which is the rear surface is provided at the other end of the connection unit 403. An open end of the through-hole 4034 is circular and the inner diameter of the through-hole 4034 may be substantially the same as or greater than the outer diameter of the end surface of the protrusion 4045a-1. A cylindrical tubular protrusion 4081 of which a front end is opened is provided in the middle of one plate surface 408b of the contact unit 408. The core direction of the cylindrical tubular protrusion 4081 is substantially orthogonal to the plate surface 408b. The outer diameter of the tubular protrusion 4081 is slightly less than the inner diameter of the through-hole 4034 and the inner diameter of the tubular protrusion 4081 is substantially the same as the outer diameter of the end surface of the protrusion 4045a-1.

In the connection unit 403, the plate surface 4033 is disposed toward the plate surface 409b of the pedestal 409 (the plate surface 401b of the base unit 401). The rotation shaft 4031 of the connection unit 403 is supported to be rotatable in the insertion hole 2045aa-3. The protrusion 4045a-1 of the fixed unit 4045-1 is inserted into the through-hole 4034 of the connection unit 403 from the plate surface 4033. The cylindrical tubular protrusion 4081 of the contact unit 408 is inserted into the through-hole 4034 of the connection unit 403 from the plate surface 4032. A protrusion 4045a-1 that penetrates through the through-hole 4034 is inserted and fixed to the inner wall surface of the cylindrical tubular protrusion 4081. Thus, the other end of the connection unit 403 and the contact unit 408 are fitted in the fixed unit 4045-1.

<Switch 101>

The switch 101 that has a push-down unit 101a is fixed to the plate surface 409b of the pedestal 409. The switch 101 according to the embodiment is located in the XB4 direction (a predetermined direction in FIG. 5) with respect to the slide mechanism including the movable unit 1025-3, the linking units 102ea-3 and 102eb-3, the linking unit 2045-3, the connection unit 403, and the contact unit 408. The switch 101 detects pushing of the push-down unit 101a in the XB4 direction (push-down in the embodiment) to detect displacement of the support unit 2045a-3 (a specific portion) included in the slide mechanism. That is, the switch 101 is disposed so that the push-down unit 101a is oriented toward the push-down unit 101a. The push-down unit 101a does not come into contact with the support unit 2045a-3 in a state which the movable unit 1025-i of the actuator 102-i is stopped and elastic forces from the springs 1022-i and 1023-i are balanced, and the slide mechanism performs a periodic reciprocating slide motion in the XB4 direction (the predetermined direction) and the XA4 direction (an opposite direction to the predetermined direction) with respect to the base mechanism based on a physical motion of the actuator, as will be described below. On the other hand, when the support unit 2045a-3 arrives at the push-down unit 101a and pushes the push-down unit 101a in the XB4 direction, a push-down signal indicating that the push-down unit 101a is pushed (that is, a signal indicating that the push-down unit 101a is in the push-down state) is transmitted to the control unit 103 and driving control of the actuator 102-i is performed, as will be described below. For example, the switch 101 is disposed at a position at which a signal line is short-circuited and the switch is entered when a push-down distance in the XB4 direction of the push-down unit 101a exceeds a threshold. An example of the switch 101 is a push-down switch such as a tact switch.

<Control Unit 103>

The control unit 103 is fitted on the surface 401a of the base unit 401. The control unit 103 is a device that performs driving control on the actuator 102-i in accordance with the push-down signal transmitted from the switch 101. The control unit 103 may be configured by only an electronic circuit or may be configured by a predetermined program being read by a central processing unit (CPU). The control unit 103 is electrically connected to the switch 101 and the actuator 102-i. For example, a signal line of the switch 101 is electrically connected to a digital interface port of the control unit 103 and a signal line of the control unit 103 is electrically connected to a coil 1024-i of the actuator 102-i. Further, the control unit 103 is also electrically connected with a power supply (not illustrated). The driving control of the actuator 102-i performed by the control unit 103 may be control of a driving mode in which the actuator 102-i is driven (ON) and stopped (OFF) or may be control of other driving modes of the actuator 102-i. As the control of the other driving modes, control of magnitude of a control signal (a current or a voltage) supplied to the coil 1024-i of the actuator 102-i, control of a type of a waveform of a control signal, switching control of the actuator 102-i supplied with a control signal, and the like can be exemplified. The control unit 103 performs driving control in accordance with a state of a push-down signal from the switch 101. For example, whenever the control unit 103 detects a push-down signal, the control unit 103 may switch between driving and stopping of the actuator 102-i (supplying and stopping the control signal to the coil 1024-i) or may measure a duration of the detected push-down signal and perform driving control in accordance with the length of the duration of the push-down signal. That is, the driving control may be performed in accordance with the length of the duration in which the support unit 2045a-3 (a specific portion) moved in the predetermined direction by a width greater than an amplitude at the time of a reciprocating slide motion is detected by the switch 101 (a detection unit). For example, when the push-down unit 101a is pushed down for a short time and the duration of a detected push-down signal is equal to or less than the threshold, the control unit 103 may set the driving mode in which the actuator 102-i is driven (a mode in which the control signal is supplied to the coil 1024-i). When the push-down unit 101a is pushed down for a long time and the duration of a detected push-down signal is greater than the threshold, the control unit 103 may set the driving mode in which the actuator 102-i is stopped (a mode in which the control signal is not supplied to the coil 1024-i). Alternatively, the above-exemplified three or more types of driving modes may be set or the control unit 103 may switch between driving modes in accordance with a duration of the push-down signal.

<Operation>

Figure 6A:
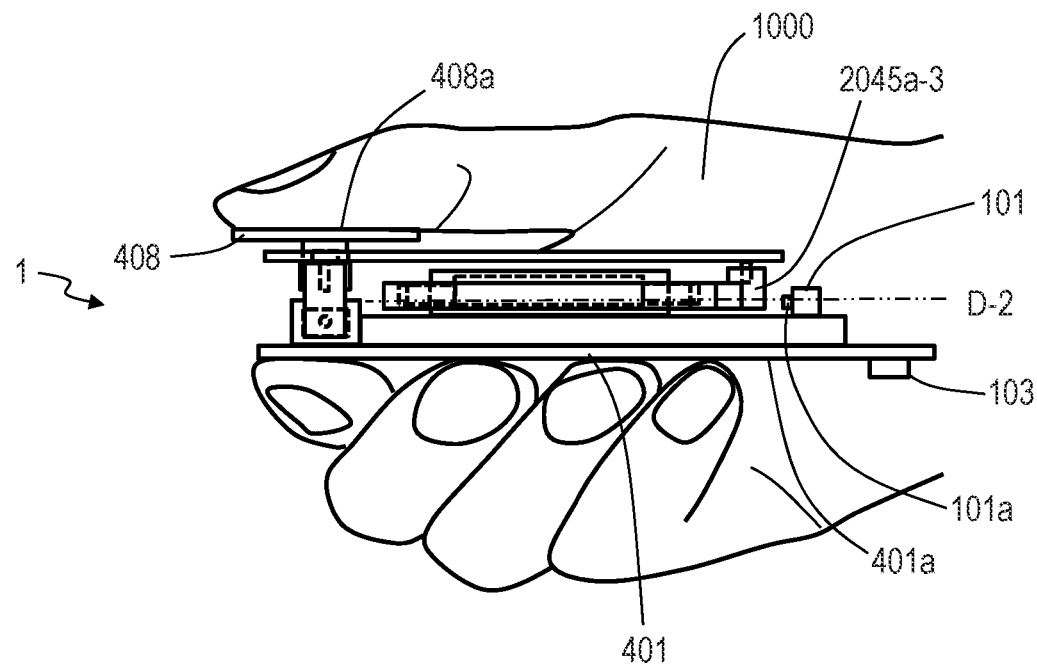
FIGS. 6A and 6B are conceptual diagrams illustrating a use state of the vibration device according to the first embodiment.

An operation of the vibration device 1 will be described with reference to FIGS. 5 and 6. The user is allowed to grip the vibration device 1 in a state in which a palm of the human body 1000 of the user brought into contact with the other plate surface 408a of the contact unit 408 or a cloth or the like is interposed between the human body and the plate surface 408*a* (see FIG. 6A). The slide mechanism performs a periodic reciprocating motion in the predetermined direction (the XB4 direction or the YB4 direction) and the opposite direction (the XA4 direction or the YA4 direction) to the predetermined direction with respect to the base mechanism based on the physical motion of the actuator i and gives a force based on the reciprocating slide motion to a part of the human body 1000 with which the contact unit 408 comes into direct or indirect contact. The slide mechanism is a mechanism that includes the movable unit 1025-*i*, the linking units 102*ea*-*i* and 102*eb*-*i*, the plate spring units 1043-1 and 1044-1, the fixed unit 4045-1, the linking unit 2045-3, the connection unit 403, and the contact unit 408. The base mechanism is a mechanism that includes the base unit 401, the pedestal 409, the support units 1026-1 and 1026-3. This will be described in detail below.

When the actuator 102-3 is driven, the movable unit 1025-3, the linking units 102*ea*-3 and 102*eb*-3, and the linking unit 2045-3 perform asymmetric vibration (a reciprocating slide motion) in the XA4-XB4 direction along the D-2 axis. With the vibration, a force along the D-2 axis is given to the connection unit 403 supported by the linking unit 2045-3 and a force in the direction extending along the D-2 axis is also given to the contact unit 408 supported by the connection unit 403. Thus, the contact unit 408 performs asymmetric vibration (the reciprocating slide motion) along with all of the movable unit 1025-3, the linking units 102*ea*-3 and 102*eb*-3, and the linking units 2045-3. As a result, a force based on the asymmetric vibration is given to a part of the human body with which the contact unit 408 comes into direct or indirect contact. The force in the direction extending along the D-2 axis given to the contact unit 408 is given to the plate spring units 1043-1 and 1044-1 and the fixed unit 4045-1. Thus, the plate spring units 1043-1 and 1044-1 are elastically deformed (bent) in the direction extending along the D-2 axis. Thus, the asymmetric vibration of the contact unit 408 along the D-2 axis can inhibit interference of the actuator 102-1 and a pseudo-force sense can be presented efficiently from the contact unit 408 supported by the connection unit 403. As described above, at the time of the reciprocating slide motion, the support unit 2045*a*-3 does not come into contact with the push-down unit 101*a* of the switch 101.

On the other hand, when the actuator 102-1 is driven, the movable unit 1025-1 and the linking units 102*ea*-1, 102*eb*-1, 1041-1, and 1042-1 perform the asymmetric vibration (the reciprocating slide motion) in the YA4-YB4 direction along the D-1 axis. With the asymmetric vibration, a force in the direction extending along the D-1 axis is given to the plate spring units 1043-1 and 1044-1 and the fixed unit 4045-1 supported by the linking units 1041-1 and 1042-1. Thus, the plate spring units 1043-1 and 1044-1 perform the asymmetric vibration (the reciprocating slide motion) in the YA4-YB4 direction along the D-1 axis along with the movable unit 1025-1 and the linking units 102*ea*-1, 102*eb*-1, 1041-1, and 1042-1. The plate spring units 1043-1 and 1044-1 to which the force in the direction extending along the D-1 axis is given from the linking units 1041-1 and 1042-1 give the force in the direction extending along the D-1 axis to the fixed unit 4045-1. The fixed unit 4045-1 gives the force in this direction to the connection unit 403 and the contact unit 408. Thus, the connection unit 403 and the contact unit 408 perform a periodic asymmetric rotation motion about the insertion hole 2045*aa*-3 of the support unit 2045*a*-3 of the linking unit 2045-3 (an asymmetric rotation motion about the rotation shaft 4031 substantially orthogonal to the D-1 axis and the D-2 axis). Thus, a force based on the asymmetric rotation motion is given to the part of the human body with which the contact unit 408 comes into direct or indirect contact. Thus, the asymmetric vibration of the contact unit 408 along the D-1 axis can inhibit interference of the actuator 102-3 and a pseudo-force sense can be presented efficiently to a part of the human body with which the contact unit 408 comes into direct or indirect contact. At the time of the reciprocating slide motion, the support unit 2045*a*-3 does not come into contact with the push-down unit 101*a* of the switch 101.

The same applies when the actuators 102-1 and 102-3 are simultaneously driven.

Figure 6B:
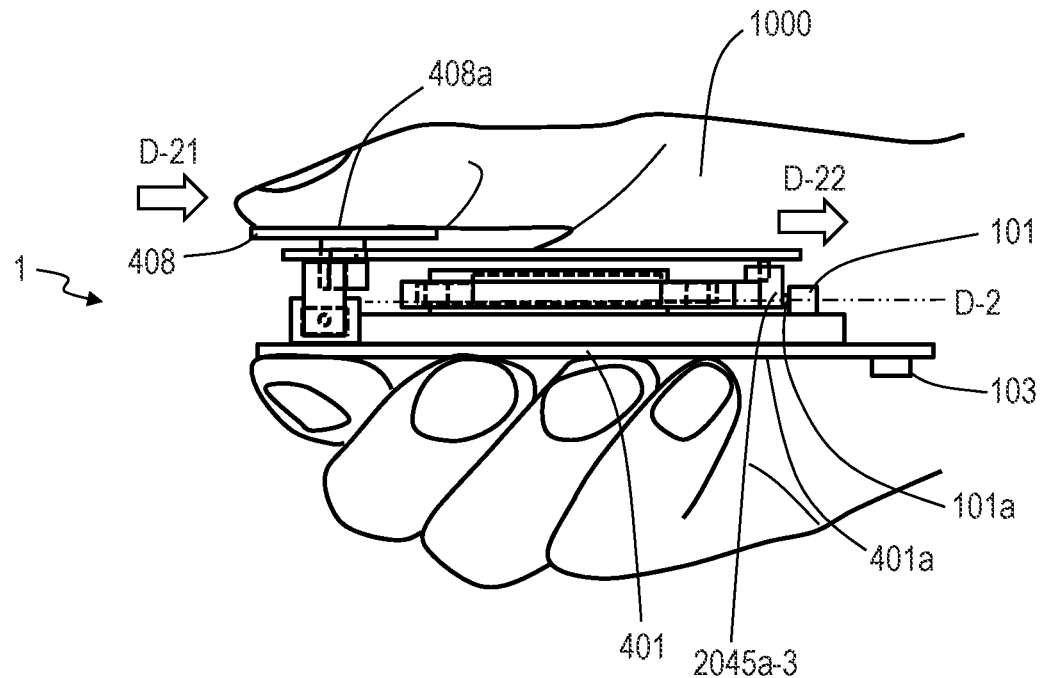
Figure 7A:
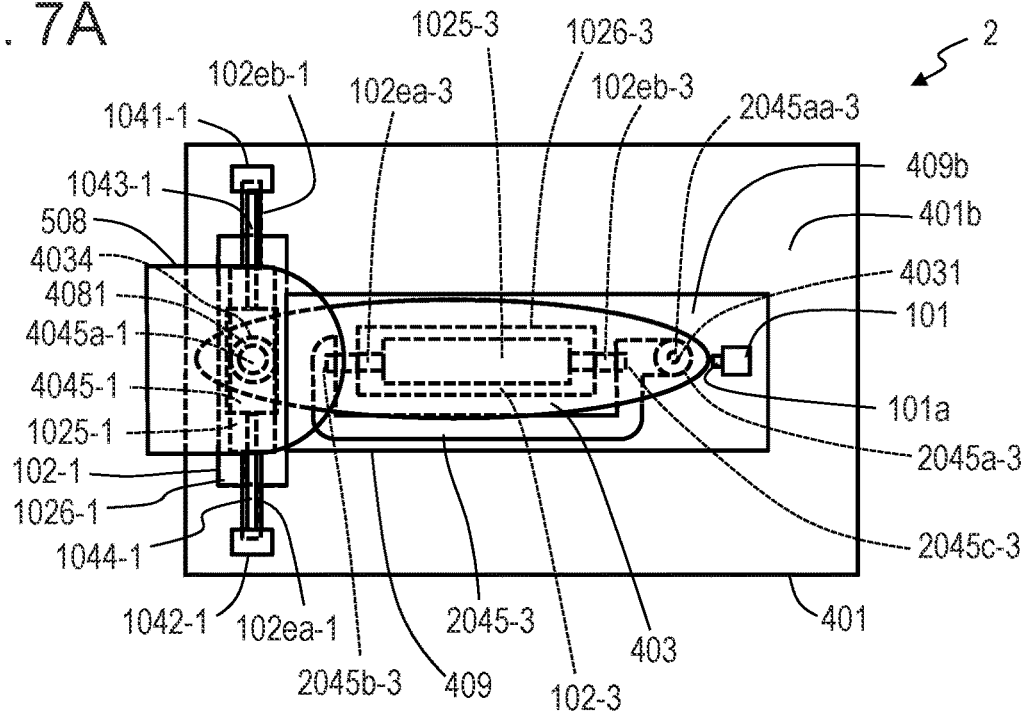
FIG. 7A is a transparent plan view exemplifying a configuration of a vibration device according to a second embodiment.
Figure 7B:
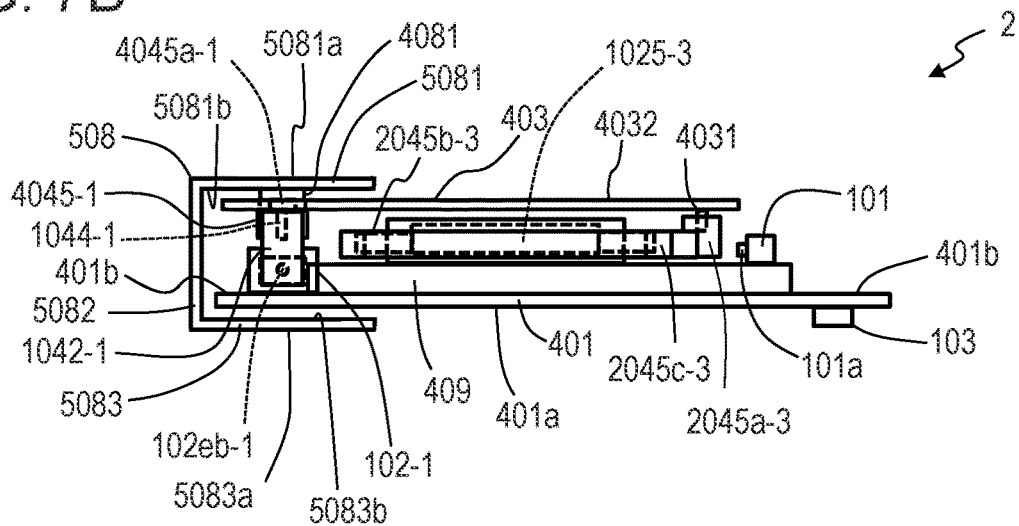
FIG. 7B is a transparent front view exemplifying the configuration of a vibration device according to the second embodiment.
Figure 7C:
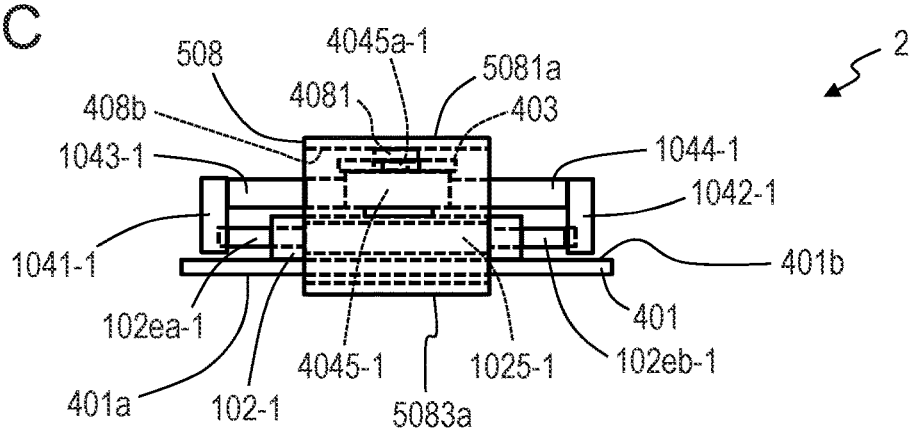
FIG. 7C is a transparent left side view exemplifying the configuration of the vibration device according to the second embodiment.

As exemplified in FIG. 6B, when a force in a D-21 direction is given to the contact unit 408 (the slide mechanism) from the part of the human body 1000 with which the contact unit 408 comes into direct or indirect contact, the support unit 2045*a*-3 (the specific portion of the slide mechanism) can be moved in a D-22 direction by a width greater than an amplitude at the time of the above-described reciprocating slide motion. When the support unit 2045*a*-3 moved in the predetermined direction by the width greater than the amplitude at the time of the reciprocation slide motion in this way arrives at the push-down unit 101*a* of the switch 101 and pushes down the push-down unit 101*a* in the D-22 direction (when the detection unit detects the support unit 2045*a*-3 moved in the predetermined direction by the width greater than the amplitude at the time of the reciprocating slide motion), a push-down signal indicating that the push-down unit 101*a* is pushed is transmitted to the control unit 103 and the control unit 103 performs driving control on the actuator 102-*i*, as described above. The user can perform this operation irrespective of whether the control signal is supplied to the actuator 102-*i* (whether the actuator 102-*i* is driven). The user can perform this operation without removing his or her hand from the vibration device 1 or switching hands, and thus convenience of the operation is high.

As described above, the slide mechanism according to the embodiment performs the reciprocating slide motion on the base mechanism based on the physical motion of the movable unit 1025-3 of the actuator 102-3. The slide mechanism is a mechanism that includes the movable unit 1025-3, the linking units 102*ea*-3 and 102*eb*-3, the linking unit 2045-3, the connection unit 403, and the contact unit 408. The base mechanism is a mechanism that includes the base unit 401, the pedestal 409, and the support unit 1026-3. Here, the movable unit 1025-3 is supported by the support unit 1026-3 through the springs 1022-3 and 1023-3. Therefore, the support unit 2045*a*-3 (the specific portion of the slide mechanism) moved in the predetermined direction by the width greater than the amplitude at the time of the reciprocation slide motion can be returned to a reference position based on at least elastic forces of the springs 1022-3 and 1023-3 (elastic bodies). The reference position is a position at which the support unit 2045*a*-3 does not come into contact with the push-down unit 101*a* of the switch 101. The support unit 2045*a*-3 can also return to the reference position by elastic forces of the plate spring units 1043-1 and 1044-1 through the connection unit 403. Thus, when the force in the D-21 direction added from the human body 1000 to the contact unit 408 is merely weakened (for example, the human body 1000 is merely removed from the contact unit 408), the support unit 2045*a*-3 moves away from the push-down unit 101*a* of the switch 101. Since it is not necessary to return the support unit 2045*a*-3 to the reference position by a force in the opposite direction to the D-21 direction from the human body 1000, operability is good.

Second Embodiment

A second embodiment will be described. The second embodiment is a modification example of the first embodiment. The second embodiment differs from the first embodiment in the structure of a contact unit. The others are the same as those of the first embodiment. Hereinafter, differences from the embodiments described so far will be mainly described below. The same reference numerals are given to the same portions and description thereof will be omitted.

A configuration of a vibration device 2 according to the embodiment will be described with reference to FIGS. 7A to 7C and 8. As exemplified in FIGS. 7A to 7C and 8, the vibration device 2 according to the embodiment includes the base unit 401, the actuator 102-$i$ (where i=1, 3), the plate spring units 1043-1 and 1044-1, the linking units 1041-1 and 1042-1, the fixed unit 4045-1, the linking unit 2045-3, the pedestal 409, the connection unit 403, a contact unit 508, the switch 101, and the control unit 103. The actuator 102-$i$ (where i=1, 3) includes the support unit 1026-$i$, the movable unit 1025-$i$, the linking unit 102$ea$-$i$, and the linking unit 102$eb$-$i$.

The contact unit 508 is a rigid body or members considered to be a rigid body. The contact unit 508 includes a first region 5081, a second region 5082, and a third region 5083. The first region 5081 is disposed on one plate surface 401$b$ of the base unit 401. The second region 5082 is supported at one end of the first region 5081. The third region 5083 is supported at the other end of the second region 5082 and is disposed on the other surface 401$a$ of the base unit 401 (the other surface of the base mechanism). Each of the first region 5081, the second region 5082, and the third region 5083 has a substantial plate shape. In the embodiment, a substantial plate-shaped portion of the first region 5081 and a substantial plate-shaped portion of the third region 5083 are disposed to be substantially parallel and are substantially orthogonal to a substantial plate-shaped portion of the second region 5082. The cylindrical tubular protrusion 4081 described in the first embodiment is provided in the middle of one plate surface 5081$b$ of the first region 5081. In the connection unit 403, the plate surface 4033 is disposed toward the plate surface 409$b$ of the pedestal 409. The rotation shaft 4031 of the connection unit 403 is supported to be rotatable in the insertion hole 2045$aa$-3. The protrusion 4045$a$-1 of the fixed unit 4045-1 is inserted into the through-hole 4034 of the connection unit 403 from the plate surface 4033. The cylindrical tubular protrusion 4081 of the contact unit 508 is inserted into the through-hole 4034 of the connection unit 403 from the plate surface 4032. The protrusion 4045$a$-1 penetrated through the through-hole 4034 is inserted and fixed to the inner wall surface of the cylindrical tubular protrusion 4081. Thus, the first region 5081 is supported by the fixed unit 4045-1. At least a part of the mechanism including the pedestal 409 and the support unit 1026-1 and 1026-3, at least a port of the mechanism including the movable unit 1025-1 and the linking units 102$ea$-1, 102$eb$-1, 1041-1, and 1042-1, and at least a part of the mechanism including the plate spring units 1043-1 and 1044-1 and the fixed unit 4045-1 are disposed between the first region 5081 and the third region 5083.

Figure 8A:
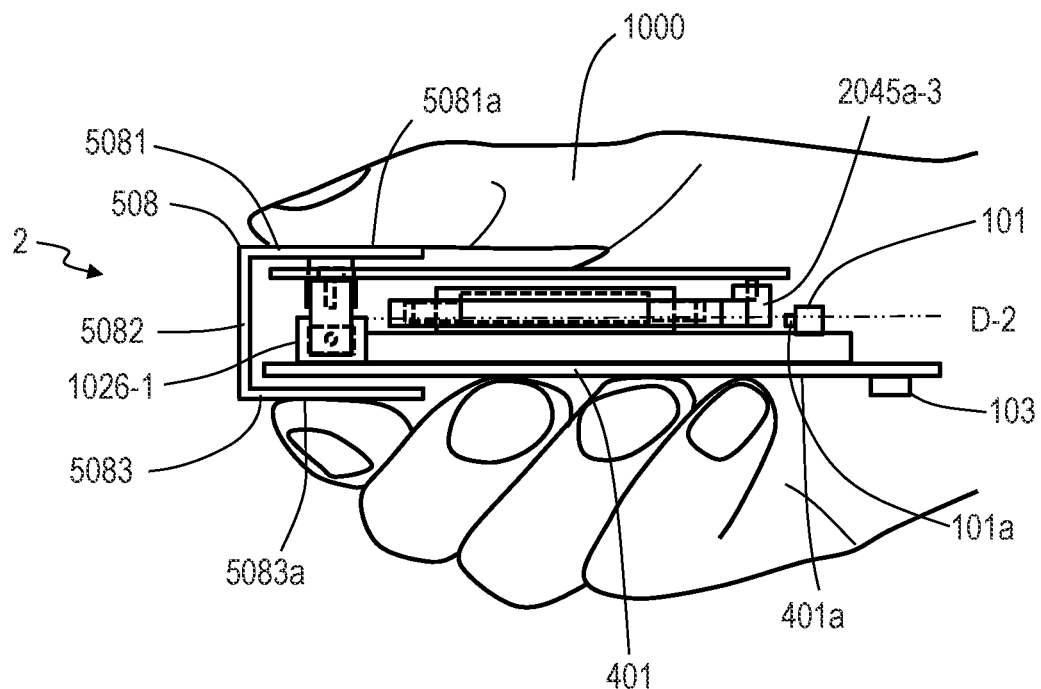
FIGS. 8A and 8B are conceptual diagrams illustrating a use state of the vibration device according to the second embodiment.

As exemplified in FIG. 8A, the user supports the mechanism (the base mechanism) including the pedestal 409 and the support units 1026-1 and 1026-3 with the palm of the human body 1000 and grips the outside plate surface 5081$a$ of the first region 5081 and the outside plate 5083$a$ of the third region 5083 of the contact unit 508.

Figure 8B:
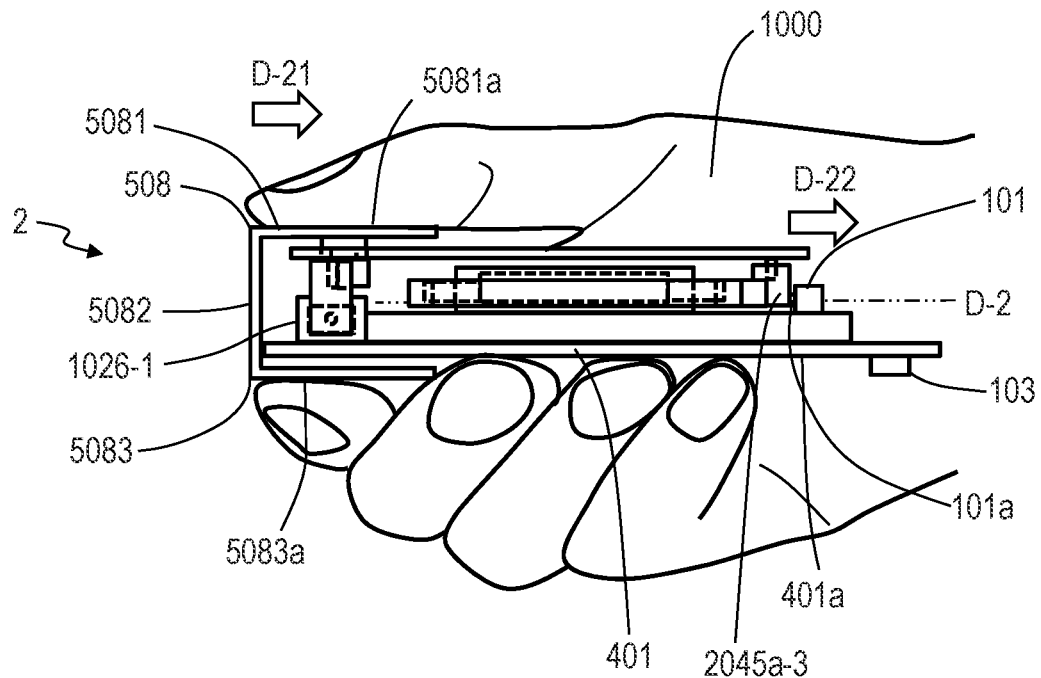

As exemplified in FIG. 8B, when the force in the D-21 direction is given to the contact unit 508 (the slide mechanism) from the part of the human body 1000 with which the contact unit 508 comes into direct or indirect contact, the support unit 2045$a$-3 (the specific portion of the slide mechanism) is movable in the D-22 direction by the width greater than the amplitude at the time of the above-described reciprocating slide motion. When the support unit 2045$a$-3 moved in the D-22 direction by the width greater than the amplitude at the time of the reciprocation slide motion in this way arrives at the push-down unit 101$a$ of the switch 101 and pushes down the push-down unit 101$a$ in the D-22 direction (when the detection unit detects the support unit moved in the predetermined direction by the width greater than the amplitude at the time of the reciprocating slide motion), a push-down signal indicating the push-down unit 101$a$ is pushed is transmitted to the control unit 103 and the control unit 103 performs driving control on the actuator 102-$i$, as described above.

Third Embodiment

In the first and second embodiments, a sensor that detects the support unit 2045$a$-3 (a specific portion included in the slide mechanism) moved in the XB4 direction (the predetermined direction) by the width greater than the amplitude at the time of the reciprocation slide motion may be used as a "detection unit" instead of the switch 101.

Figure 9:
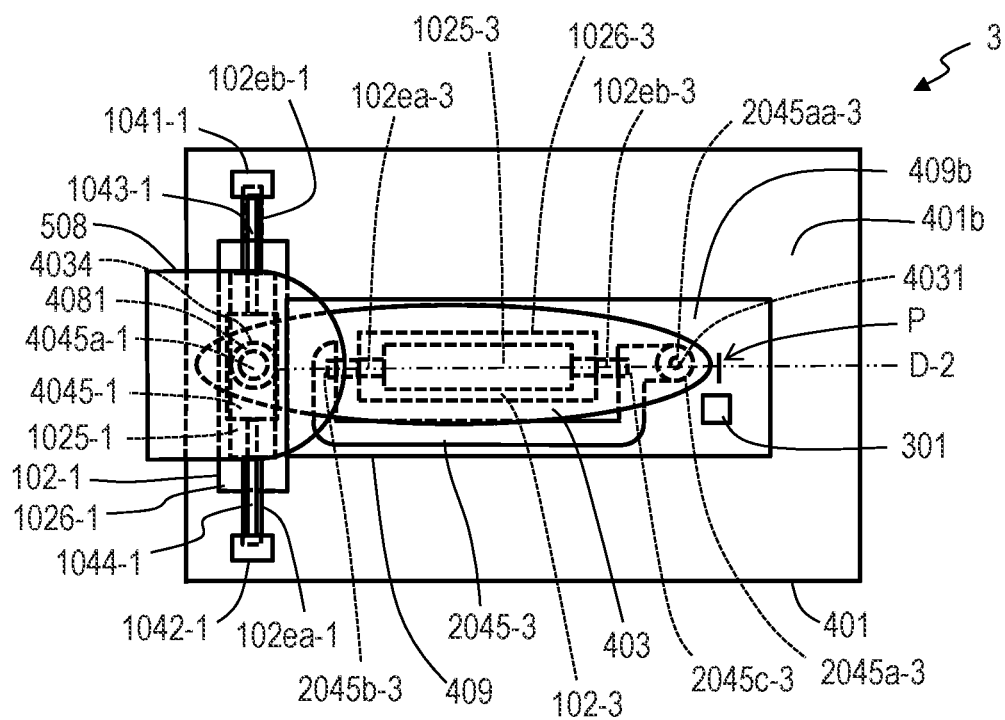
FIG. 9 is a transparent plan view exemplifying a configuration of a vibration device according to a third embodiment.

For example, in a vibration device 3 exemplified in FIG. 9, the switch 101 of the vibration device 2 according to the second embodiment is substituted with a sensor 301 (a detection unit). The others are the same as the vibration device 2. The sensor 301 is a sensor detecting that the support unit 2045$a$-3 arrives at a position P. As the sensor 301, a laser displacement sensor, an LED sensor, a magnetic positional sensor, or the like can be used. The support unit 2045$a$-3 does not arrive at the position P in a state in which the movable unit 1025-$i$ of the actuator 102-$i$ is stopped and elastic forces from the springs 1022-$i$ and 1023-$i$ are balanced and a state in which the slide mechanism performs a periodic reciprocating slide motion in the predetermined direction and the opposite direction to the predetermined direction with respect to the base mechanism based on a physical motion of the actuator, as will be described below. On the other hand, as exemplified in FIG. 8B, when the force in the D-21 direction is given to the contact unit 408 (the slide mechanism) from the human body 1000 and the support unit 2045$a$-3 (the specific portion of the slide mechanism) is moved in the D-22 direction by the width greater than the amplitude at the time of the reciprocating slide motion, the support unit 2045$a$-3 can arrive at the position P. When the sensor 301 detects that the support unit 2045$a$-3 arrives at the position P (the support unit 2045$a$-3 is moved in the predetermined direction by the width greater than the amplitude at the time of the reciprocating slide motion) and a detection signal indicating that the support unit 2045$a$-3 arrives is transmitted to the control unit 103. The control unit 103 performs driving control on the above-described actuator 102-$i$ in accordance with the detection signal instead of the push-down signal of the first embodiment. The others are the same as those of the first and second embodiments.

Other Modification Examples

The present invention is not limited to the above-described embodiments. For example, in the first to third embodiments, the vibration devices 1 to 3 present the pseudo-force sense to a user, but the vibration devices 1 to 3 may present a haptic force other than the pseudo-force sense to a user. The reciprocating slide motion may be the asymmetric vibration described above or may be symmetric vibration.

In the third embodiment, the sensor 301 that detects the support unit 2045a-3 (the specific portion included in the slide mechanism) moved in the XB4 direction (the predetermined direction) by the width greater than the amplitude at the time of the reciprocation slide motion by detecting that the support unit 2045a-3 arrives at the specific position P has been used as the "detection unit". However, any sensor may be used as the "detection unit" as long as the sensor can detect that the support unit 2045a-3 moved in the XB4 direction by the width greater than the amplitude at the time of the reciprocation slide motion. For example, a sensor detecting the position of a portion included in the slide mechanism other than the support unit 2045a-3 may be used as the "detection unit" or a sensor detecting a distance from the specific portion included in the slide mechanism may be used as the "detection unit". Alternatively, a sensor detecting strength of a magnetic field from a permanent magnet mounted on the slide mechanism may be used as the "detection unit".

In the first to third embodiments, the vibration devices have included only one detection unit. However, the vibration devices may include a plurality of detection units (for example, switches or sensors). In this case, a user applies a force in each direction to the slide mechanisms, each specific portion of the slide mechanism is displaced in each direction, and some or all of the detection units detect displacement of each specific portion. Each specific portion is movable in each direction by the width greater than the amplitude at the time of the reciprocation slide motion when a force is given to the slide mechanism from a part of the human body with which the slide mechanism comes into direct or indirect contact. When each detection unit detects each specific portion moved in each direction by the width greater than the amplitude at the time of the reciprocating slide motion, each driving control is performed on the actuator in accordance with a detection state of each detection unit. For example, the vibration device may include a base mechanism, a first actuator, a second actuator, a slide mechanism, a first detection unit, and a second detection unit. The first actuator performs a physical motion based on a supplied first control signal. The second actuator performs a physical motion based on a supplied second control signal. The slide mechanism performs a first periodic reciprocating slide motion in a first predetermined direction and an opposite direction to the first predetermined direction with respect to the base mechanism based on the physical motion of the first actuator and gives a force based on the first reciprocating slide motion to a part of the human body with which the slide mechanism comes into contact, and performs a second periodic reciprocating slide motion in a second predetermined direction and an opposite direction to the second predetermined direction with respect to the base mechanism based on the physical motion of the second actuator and gives a force based on the second reciprocating slide motion to the human body. The first detection unit is located in the first predetermined direction with respect to the slide mechanism and detects displacement of a first specific portion included in the slide mechanism. The second detection unit is located in the second predetermined direction with respect to the slide mechanism and detects displacement of a second specific portion included in the slide mechanism. Here, the first predetermined direction differs from the second predetermined direction. For example, the first predetermined direction is substantially orthogonal to the second predetermined direction. The first specific portion is movable in the first predetermined direction by a width greater than the amplitude at the time of the first reciprocating slide motion when the force is given to the slide mechanism from the part of the human body with which the slide mechanism comes into direct or indirect. Driving control is performed on the first actuator and/or the second actuator when the first detection unit detects the first specific portion moved in the first predetermined direction by the width greater than the amplitude at the time of the first reciprocating slide motion. The second specific portion is movable in the second predetermined direction by a width greater than the amplitude at the time of the second reciprocating slide motion when the force is given to the slide mechanism from the part of the human body with which the slide mechanism comes into direct or indirect. Driving control is performed on the first actuator and/or the second actuator when the second detection unit detects the second specific portion moved in the second predetermined direction by the width greater than the amplitude at the time of the second reciprocating slide motion.

The above-described various processes may be performed chronologically according to the description and may also be performed in parallel or individually as necessary or with a processing capability of a device performing the processes. In addition, the present invention can, of course, be modified appropriately within the scope of the present invention without departing form the gist of the present invention.

The control unit 103 is configured by allowing a general-purpose or dedicated computer that includes a processor (a hardware processor) such as a central processing unit (CPU), a memory such as a random access memory (RAM) or a read-only memory (ROM), and the like to execute a predetermined program. The computer may include one processor or memory or may include a plurality of processors or memories. The program may be installed on the computer or may be recorded on a ROM or the like in advance. Some or all of the processing units may be configured using an electronic circuit that realizes a processing function without using a program rather than an electronic circuit (circuitry) such as a CPU that realizes a functional configuration by reading the program. An electronic circuit configured as one device may include a plurality of CPUs.

When the control unit 103 is realized by a computer, processing content of a function of the control unit 103 is described by a program. By allowing the computer to execute the program, the processing function of the control unit 103 is realized on the computer. The program that describes the processing content can be recorded on a computer-readable recording medium. An example of the computer-readable recording medium is a non-transitory recording medium. An example of the recording medium is a magnetic recording medium, an optical disc, a magneto-optical recording medium, a semiconductor memory, or the like.

The program is distributed, for example, by selling, transferring, or lending a portable recording medium such as a DVD or a CD-ROM on which the program is recorded. Further, the program may be distributed by storing the program in a storage device of a server computer and transmitting the program from the server computer to another computer via a network.

For example, a computer that executes the program first stores the program recorded on a portable recording medium or the program transmitted from a server computer temporarily on an own storage device. Then, when a process is performed, the computer reads the program stored in the own storage device and performs a process in accordance with the read program. As another execution form of the program, the computer may directly read the program from the portable recording medium and perform a process in accordance with the program and may further perform a process in accordance with the received program in sequence whenever the program is transmitted from the server computer to the computer. The above-described processes may be performed by a so-called application service provider (ASP) type service for realizing the processing functions in accordance with only an execution instruction and result acquisition without performing transmission of the program to the computer from the server computer.

The processing function of the control unit 103 may be realized by executing a predetermined program on a computer, but at least some of the processing functions may be realized by hardware.

REFERENCE SIGNS LIST

1 to 3 Vibration device
401 Base unit (base mechanism)
409 Pedestal (base mechanism)
1026-1, 1026-3 Support unit (base mechanism)
102-*i* Actuator
1025-*i* Movable unit (slide mechanism)
102*ea*-*i*, 102*eb*-*i* Linking unit (slide mechanism)
1043-1, 1044-1 Plate spring unit (slide mechanism)
4045-1 Fixed unit (slide mechanism)
2045-3 Linking unit (slide mechanism)
403 Connection unit (slide mechanism)
408, 508 Contact unit (slide mechanism)
101 Switch (detection unit)
301 Sensor (detection unit)

The invention claimed is:

1. A vibration device comprising:
a base mechanism;
an actuator configured to perform a physical motion based on a supplied control signal;
a slide mechanism configured to perform a periodic reciprocating slide motion in a predetermined direction and an opposite direction to the predetermined direction with respect to the base mechanism based on the physical motion of the actuator and to give a force based on the reciprocating slide motion to a part of a human body with which the slide mechanism comes into direct or indirect contact; and
a detection unit located in the predetermined direction with respect to the slide mechanism and configured to detect displacement of a specific portion included in the slide mechanism,
wherein the specific portion is movable in the predetermined direction by a width greater than an amplitude at the time of the reciprocating slide motion when a force is given to the slide mechanism from the part of the human body with which the slide mechanism comes into direct or indirect contact, and
driving control is performed on the actuator when the detection unit detects the specific portion moved in the predetermined direction by the width greater than the amplitude at the time of the reciprocating slide motion.

2. The vibration device according to claim 1,
wherein the actuator includes a support unit, an elastic body of which one end is supported by the support unit, a movable unit performing a reciprocating motion in a state in which the movable unit is supported by the other end of the elastic body, and a coil giving a force based on the control signal to the movable unit,
wherein the slide mechanism performs the reciprocating slide motion based on the physical motion of the movable unit, and
the specific portion moved in the predetermined direction by the width greater than the amplitude at the time of the reciprocating slide motion is able to return to a reference position based on at least an elastic force of the elastic body.

3. The vibration device according to claim 1, wherein the driving control includes control of driving and stopping of the actuator.

4. The vibration device according to claim 1,
wherein the driving control is performed in accordance with a length of a duration in which the detection unit detects the specific portion moved in the predetermined direction by the width greater than the amplitude at the time of the reciprocating slide motion.

5. The vibration device according to claim 1,
wherein the detection unit is a switch that detects the specific portion moved in the predetermined direction by the width greater than the amplitude at the time of the reciprocating slide motion when the switch is pushed in the predetermined direction by the specific portion or a sensor that detects the specific portion moved in the predetermined direction by the width greater than the amplitude at the time of the reciprocating slide motion.

6. The vibration device according to claim 1,
wherein the reciprocating slide motion is periodic asymmetric vibration, and
the slide mechanism causes the human body to perceive a pseudo-force sense based on the reciprocating slide motion.

* * * * *